Oct. 26, 1954      R. C. ZEIDLER      2,692,561
HYDRODYNAMIC COUPLING
Filed Dec. 31, 1948      3 Sheets-Sheet 2
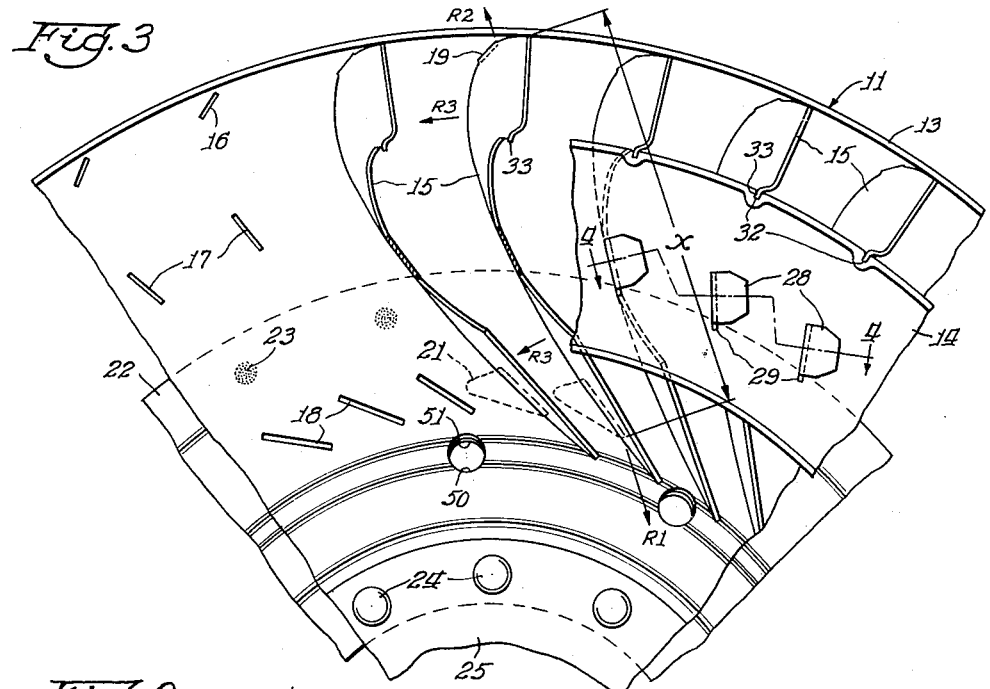
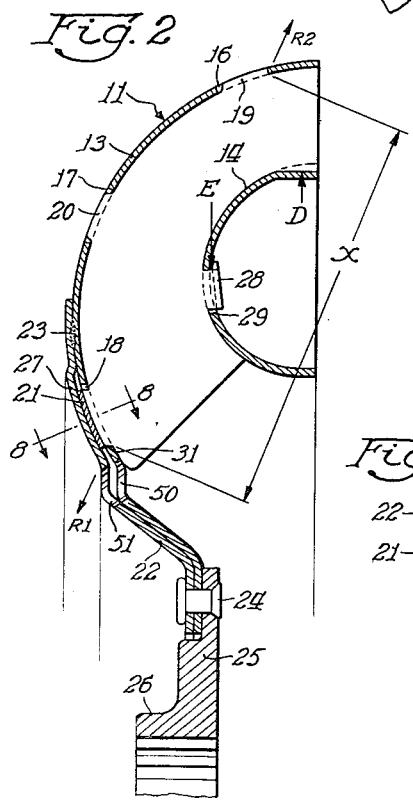
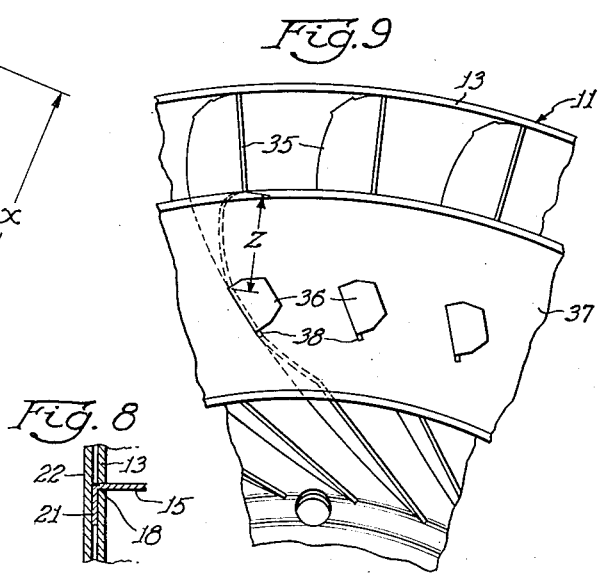
Inventor:
Reinhold C. Zeidler

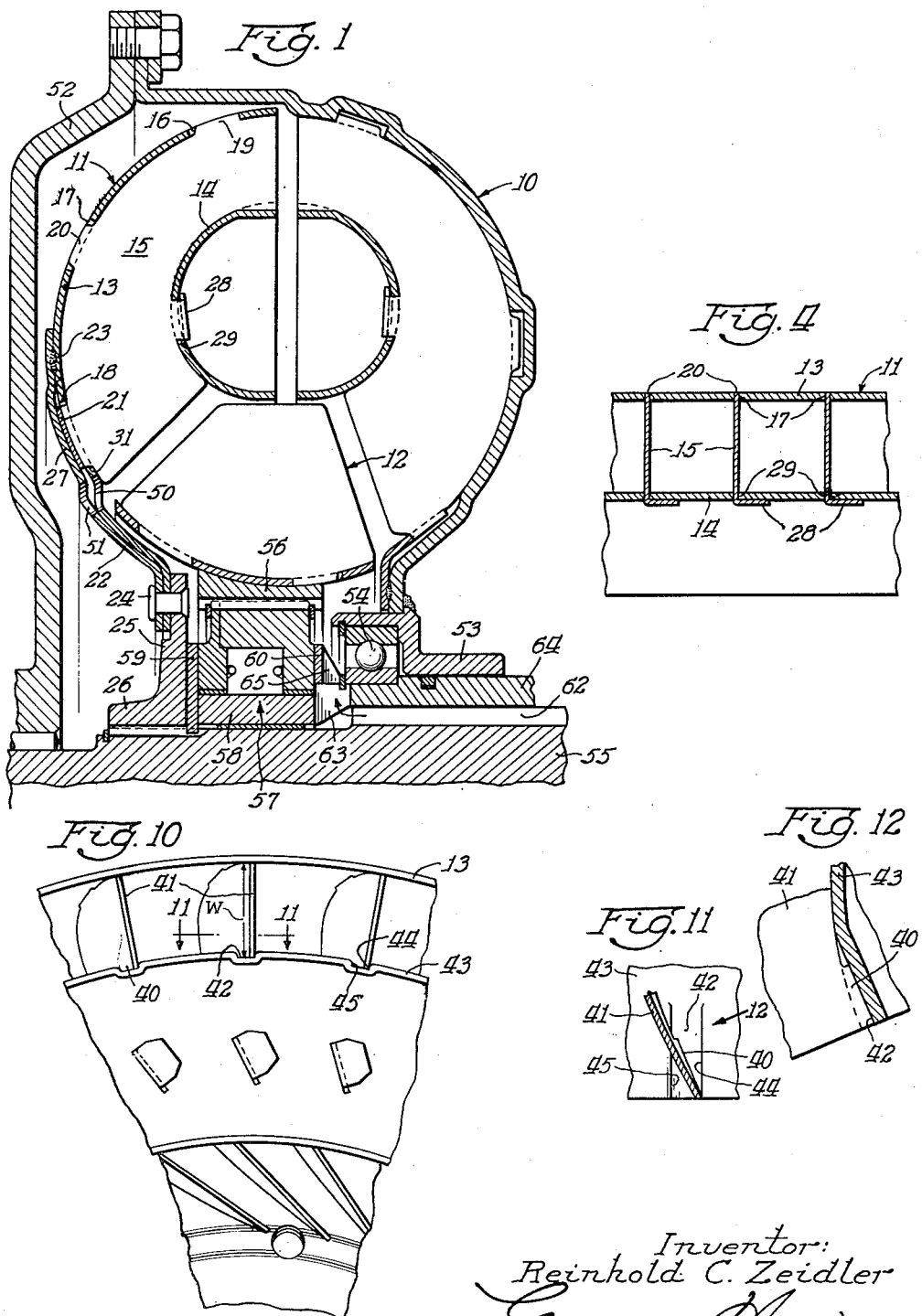

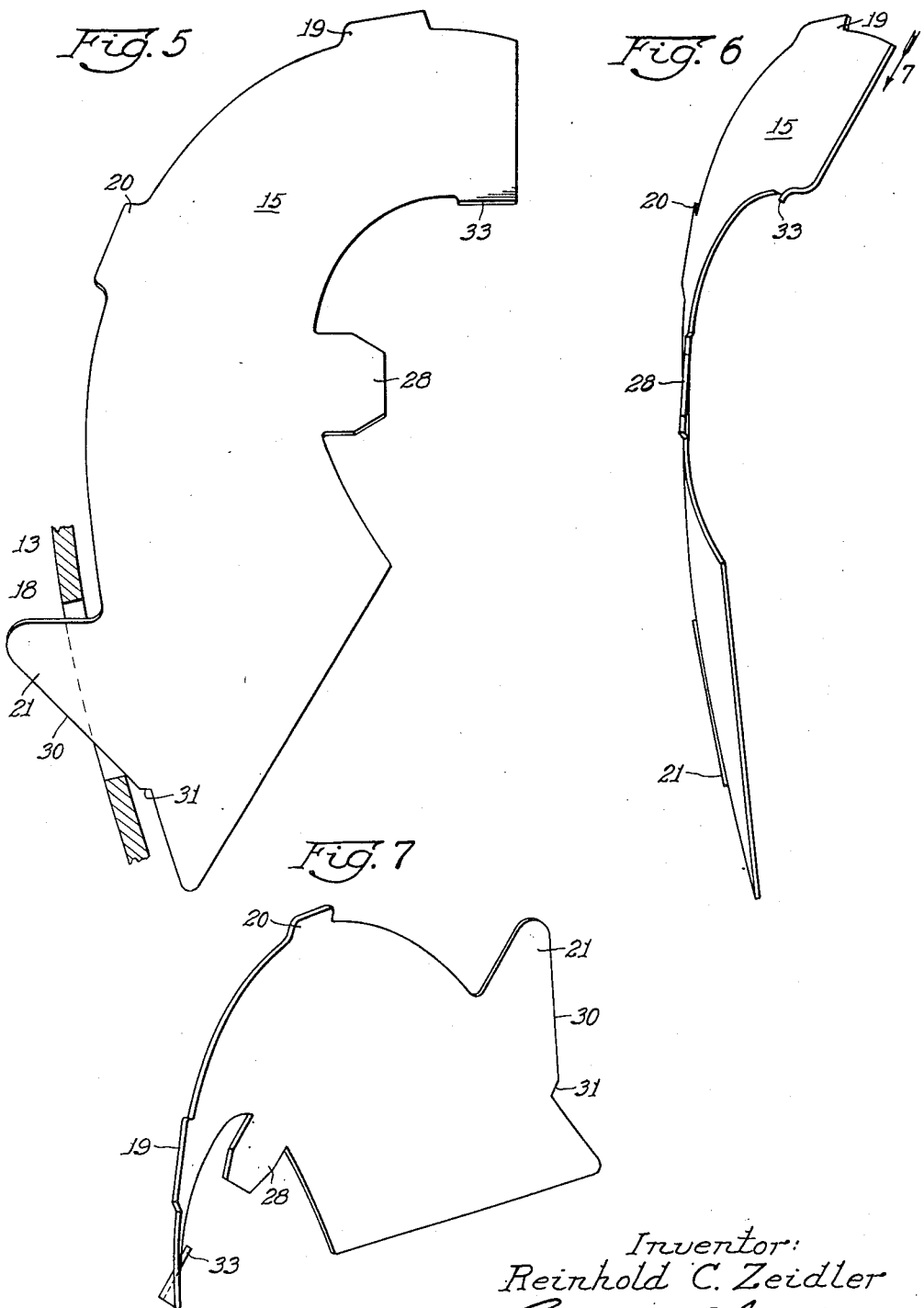

Patented Oct. 26, 1954

2,692,561

UNITED STATES PATENT OFFICE 2,692,561

HYDRODYNAMIC COUPLING

Reinhold C. Zeidler, Detroit, Mich., assignor to Borg-Warner Corporation, Chicago, Ill., a corporation of Illinois Application December 31, 1948, Serial No. 68,692

4 Claims. (Cl. 103—115)

This invention relates to hydrodynamic coupling devices and more particularly to such coupling devices for transmitting variable torque between vaned elements placed adjacent each other and operating by toroidal circulation of fluid in a closed toroidal circuit.

An object of the invention is the provision of an improved vaned element of a hydrodynamic coupling device, which vaned element is simple and rugged in construction, light in weight, efficient in operation, and easy and inexpensive to fabricate.

Another object of the invention is to provide a novel and improved method of fabricating a vaned element of a hydrodynamic coupling device wherein the component parts of the element are formed of sheet metal stampings including means for facilitating the ready location and assembly of the vanes with the other parts of the element.

A further object of the invention is to provide an improved vaned element of a hydrodynamic torque-multiplying coupling device and method of fabricating the same wherein each of the curved vanes is formed of resilient material and, in the assembly of the vanes with the other parts of the coupling, is flexed to distort the same to decrease its length to effect engagement with and securement of each vane to the other parts of the coupling and to increase its initial curvature in the assembled element for correctly controlling the toroidal circulation of fluid to obtain a predetermined torque-multiplying ratio of the coupling device.

Still another object of the invention is to provide a vaned element for a hydrodynamic torque-multiplying coupling device and method of fabricating the same in which curved vanes of resilient material are disposed in a semi-toroidal housing provided with mounting means for the vanes, and the vanes are flexed to distort the same to engage the mounting means, flexing of the vanes not only inducing reaction forces in said vanes acting to maintain said vanes in assembly with said mounting means but disposing the curvatures of the vanes for controlling the required toroidal flow of fluid necessary to obtain predetermined torque-multiplying characteristics of the coupling device.

A further object of the invention is to provide an improved arrangement and method for connecting curved vanes to a casing and a core ring of a hydrodynamic coupling element of the torque-multiplying type so that the assembly has the necessary strength to withstand the torque of the circulating fluid on the vanes during multiplication of torque.

Another object of the invention is to provide an improved vaned element of a hydrodynamic coupling device comprising semi-circular vanes of sheet metal having inherent resiliency, each curved in the direction of its thickness, fitting within a hollow semi-toroidal housing, and having positions on the outer margin thereof engaging abutments on said housing, the linear distance between said abutments being less than the linear distance between said vane portions engaged therewith whereby the vanes are flexed to engage the abutments and held in engagement therewith by reaction forces induced in said vanes, the initial curvature of the vanes permitting ready flexing of the vanes by merely increasing the curvatures thereof without undue endwise loading of the vanes resulting in collapsing of the vanes.

Still another object of the invention is to provide an improved vaned turbine or runner element of a hydrodynamic coupling device operating in a fluid in a reservoir and communicating with the fluid in the device, wherein a plurality of equalizer ports are provided in the turbine element to substantially equalize or balance the pressure of the fluid in the device and that in the reservoir during operation of the device.

These and other objects and features of the invention will become apparent from the following description taken together with the accompanying drawings, in which:

Fig. 1 is an axial section of a fragmentary portion, preferably the upper half of the impeller, turbine and stator elements of a hydrodynamic coupling device;

Fig. 2 is a sectional view of the turbine element shown in Fig. 1;

Fig. 3 is an elevational view of the turbine element shown in Fig. 2 and as seen from the right in Fig. 2;

Fig. 4 is a fragmentary section taken on line 4—4 of Fig. 3;

Figs. 5, 6 and 7 are views of one of the vanes of the turbine element shown in Fig. 1, Fig. 5 being a side elevation of a vane about to be locked mechanically to a housing, Fig. 6 being an edge view as seen from the right in Fig. 5, and Fig. 7 is a top view looking in the direction of the arrow in Fig. 6;

Fig. 8 is a sectional view taken on the line 8—8 of Fig. 2;

Figs. 9 and 10 are fragmentary elevational views, similar to that of Fig. 3, of impeller elements illustrating different modifications;

Fig. 11 is a section taken on the line 11—11 of Fig. 10; and

Fig. 12 is a side sectional view of Fig. 11 looking in the direction of the arrow in Fig. 11.

The drawings are to be undertsood as being more or less of a schematic character for the purpose of disclosing typical or preferred forms of the improvements contemplated herein, and in these drawings like reference characters identify the same parts in the different views.

Referring now to Fig. 1 of the drawings, the illustrated hydrodynamic coupling device is of the torque-multiplying type and comprises a fluid impeller or driving element 10, a turbine or driven element 11, and a stator element 12. The hydrodynamic coupling device functions to multiply the torque between an input member and an output member respectively secured to the impeller 10 and the turbine 11, all of the elements for this purpose having vanes provided with curvatures such that they are capable of providing a toroidal circulation of fluid, whereby the vanes of the impeller 10 impart energy to a body of fluid within the coupling device and the turbine element 11 receives the energy from the fluid, the stator element havng curved vanes cooperating with the curved vanes of the impeller element and the turbine element and having a reaction force impressed thereon by the fluid, the curved vanes of these elements being effective, when the stator element is held from rotation to provide multiplication of torque by the hydrodynamic coupling device, and the stator element functioning as a reaction element to change the direction of flow of the fluid so that the coupling functions to multiply torque.

The present invention is directed to providing an improved vaned element of a hydrodynamic coupling device of the torque-multiplying type, wherein the component parts of the element are formed of sheet metal stampings having some inherent resiliency, and the curved vanes are firmly secured to the other parts of the element while being maintained with their curvatures in the correct positions for obtaining a predetermined torque-multiplying ratio of the coupling device. As an example of a coupling element having these desirable features, the turbine element 11 comprises a hollow, semi-toroidal casing or shell 13 as shown in Figs. 1 and 2, the casing 13 being preferably made of sheet metal such as steel. The cross section of the casing 13 may be a semicircle or it may be of any desired contour.

The turbine element also comprises a hollow, semi-toroidal core ring 14 of sheet metal, such as steel, and a plurality of substantially semicircular vanes 15 of thin sheet metal preferably steel tempered to have some inherent springiness or resiliency. It may be noted that each of the vanes is curved in the direction of its thickness in the form of a substantially conic section, as shown in Figs. 3, 6 and 7.

Referring to Figs. 1 to 7, inclusive, the present invention contemplates the assembly of the vanes 15 with the casing 13 and core ring 14 to provide a unitary structure, wherein the vanes are firmly secured to the casing 13 and held thereby with the flexible vanes being positioned with their curvatures properly disposed for receiving the energy from the fluid imported thereto by the impeller and stator vanes which are effective to multiply the torque transmitted to the impeller, the core ring 14 being secured to the vanes and assisting in positioning the vanes.

More specifically, the casing 13 is provided with three sets of radially spaced seats or slots 16, 17 and 18, the seats of each set being in circumferentially spaced relation to each other, the seats 16 being disposed adjacent the outer marginal edge of the casing and the seats 17 and 18 being disposed between the radially inner and outer marginal edges of the casing. Each vane 15 has tabs 19, 20 and 21 extending from its outer edge to engage one each of the seats 16, 17 and 18, and the outer edges of the vanes are arcuate to fit against and engage the inner surface of the casing. It may be noted that each of the vanes 15 has its tabs 19, 20 and 21 disposed in planes spaced from each other due to the curvature of the vanes which necessitates the slots in the casing being diagonal and disposed at different angles to receive the tabs.

Referring to Figs. 2, 3 and 8, the tabs 21 extend through the slots 18 in the casing, and each of these tabs are bent over at a right angle to the edge of the vane to engage and conform to the outer surface of the casing. An annular reinforcement plate 22, substantially conforming to the contour of the casing 13, is positioned against the outer surface of the casing and secured thereto by a plurality of welds 23 adjacent its radially outer extremity and by rivets 24 at its radially inner periphery, the rivets 24 also extending through a radial flange 25 of a hub 26 connected to the load. The plate 22 is provided intermediate its radially inner and outer ends with an offset region 27 defining an annular channel or groove receiving and engaging the bent-over portions of the tabs 21 of the vanes to confine the same between the plate 22 and casing 13. The plate 22 also reinforces and strengthens the casing 13 and thereby the described assembly to withstand the substantial torque stresses imposed on the turbine transmitting to the load substantially twice the torque impressed on the impeller.

The arcuate inner edge of each vane is formed with a tab 28, and these tabs extend through circumferentially spaced seats or slots 29 in the mid-section of the core ring and are bent over to engage the inner surface of the core ring. The vanes are thus held by the core ring equidistantly spaced apart from each other and cooperate with the connections of the vanes and casing to maintain the vanes in their correct positions in the turbine assembly and to positively prevent lateral movement of the vanes.

An important feature of the invention is the formation of the vanes of sheet metal, preferably steel, having some inherent springiness or resiliency and the vanes being flexed in the impeller assembly to preload the vanes to securely fix the vanes in the casing and to increase the initial curvatures of the vanes to correctly control the toroidal circulation of fluid through the passages, defined by the vanes, to transmit the substantially increased torque to the load. Referring to Figs. 2, 3, 5, 6 and 7, it will be noted that the tab 21 on each vane 15 is formed ear-like in shape and is provided with a diagonal edge 30 and with a short, straight edge 31 of the tab parallel with the axis. In the assembly of the vanes with the casing, the radially outer tabs 19 of the vanes are inserted in the slots 16, then the central tabs 20 in the slots 17 in the casing, and last, the radially inner tabs 21 are disposed in the slots 18 in the casing. The conformation of the tab 21 on each vane is such that it will partially enter the slot 18 in the casing until the tapered or diagonal edge 30 of the tab engages the bottom edge of the slot 18 in the casing 13. In other words, there will be interference between the bottom edge of the slot 18 and the inner portion of the tab on the diagonal edge portion 30 thereof just adjacent the straight edge portion 31. This is due to the linear distance or dimension of the vane between the edge of the tab 19, engaged with the edge of the slot 17 in the casing, and the edge portion 31 of the tab 21 is greater than the linear distance between the said edge of the slot 17 and the bottom edge of the slot 18 in the casing as indicated at X in Figs. 2 and 3. Consequently, to engage the arcuate marginal edge of the vane with the inner surface of the casing and to securely hold the vane in the casing, it is necessary to apply pressure to the vane to move it toward the casing so that the tapered edge 30 of the vane will ride over the bottom edge of the slot 18 until the straight edge portion 31 of the vane is engaged with the bottom edge of the slot 18. During this operation, the vane is flexed with its resultant distortion increasing its initial curvature in a direction indicated by the arrows R3—R3 in Fig. 3, thereby decreasing its overall length so when the tab 21 of the vane snaps in place in engagement with the edges of the slot 18 in the casing, radial forces are induced in the vane in the directions indicated at R1 and R2 which effectively keep the inner and outer tabs 19 and 21 tight against the ends of their respective slots. The tabs 21 are then bent over to engage the outer surface of the casing. The vanes are thus securely held in engagement with the casing in their flexed condition and the curvatures of the vanes increased for the purpose of receiving the energy of the circulating fluid imparted to the fluid by the impeller and stator elements and transmitting the energy of the fluid to the load, to which the turbine is connected, from substantially twice the torque to the same torque as impressed on the impeller by the driving element connected thereto. The reinforcement plate is placed in position on the casing and secured thereto as previously described to apply pressure against the bent-over tabs 21 to prevent loosening of the same and to stiffen the assembly. The core ring is then seated on the inner edges of the vanes with the tabs 28 extending into the slots 29 in the core ring and bent over. It may be noted that the tabs 20 of the vanes are used merely to prevent lateral movement of the vanes.

A further feature of the invention is the manner of connecting the core ring to the vanes. More particularly, the dimensioning of the vanes and core ring is such that the core ring fits tightly against the outer edge of each tab to set up a slight inward radial force, indicated at E. Also, the outer edge of the core ring is provided with circumferentially spaced seats or notches 32 perpendicular to the plane of the edge and receiving tabs 33 on the arcuate inner edges of the vanes. As shown in Fig. 3, each tab 33 has a thickness approximately the width of the notch 32 in the core ring receiving the same. As seen in Figs. 5, 6 and 7, each tab 33 is twisted to dispose the same out of the plane of the vane to fit within the notches 32 in the core ring, the curvature of the vanes requiring the tabs to be twisted for this purpose. Referring to Figs. 2 and 3, the distance between the slots 29 and notches 32 of the core ring is slightly greater than the distance between the tabs 33 and 28 of each vane so that radial forces, indicated at D and E, are set up at the point of engagement of the tab 33 of each vane and the seat 32 of the core ring and the point of engagement of the tab 28 of each vane and the end of the slot 29 of the core ring. These radial forces will cause a slight distortion in the core ring between points E and D for the purpose of preloading the vanes and core ring to provide a damping friction connection between the vanes and core ring to further eliminate any tendency of the vanes to vibrate or rattle.

Optional arrangements and methods of connecting the core ring and vanes to provide a desirable damping frictional engagement therebetween to eliminate any tendency of the vanes to vibrate or rattle are disclosed in Fig. 9 and in Figs. 10 to 12, inclusive.

Referring first to Fig. 9, this illustrates a simple arrangement for obtaining this desirable feature and permitting the more rapid assembly of the vanes and core ring than that previously described by eliminating the twisted tabs 33 of the vanes and notches 32 in the core ring. In this arrangement, the distance between the tab 36 and the radially outer extremity of the inner arcuate edge of each vane 35, as indicated at Z, is less than the distance between each slot 38 and the radially outer edge of the core ring so that pressure must be applied to the core ring to engage its outer surface with the radially inner edges of the vanes after inserting the tabs 36 of the vanes into the slots 38 of the core ring. As a result, when the tabs of the vanes are bent over to engage the inner surface of the core ring, the inner edges of the vanes will be held in tight frictional engagement with the outer surface of the core ring as will also the tabs 36 of the vanes and the ends of the slots 38 in the core ring to prevent rattle or vibration of the vanes during operation of the hydrodynamic coupling device.

Referring to Figs. 10, 11, and 12 illustrating another alternative arrangment of assembling the core ring and vanes to provide the necessary damping frictional engagement therebetween, the impeller assembly is substantially similar to that previously described with reference to Figs. 1–8, inclusive, with the exception of the notches in the periphery of the core ring and the tabs of the vanes engaging the same. In this arrangement, the tab 40 of each vane 41 lies in the same plane as the vane 41, and each notch 42 of the core ring 43 has sufficient width to permit the tab to lie diagonally of the notch between the side surfaces 44 and 45 of the notch as shown in Figs. 10 and 11. Prior to assembly of the core ring and vanes, each notch in the core ring is made a few thousandths of an inch narrower than would be theoretically correct so that when the core ring is pressed into place on the vanes, the vane tabs are twisted slightly by the side surfaces 44 and 45 of the notches to frictionally engage the opposite edges of the tabs with these surfaces and to set up a desired radial force in the vanes to preload the vanes. Also, the depth of the notch with relation to the radial width of the vane, as indicated by the dimension W, is such as to cause a few thousandths of an inch interference between the inner surface of the casing and the outer surface of the core ring, so that when the core ring is pressed into place on the vanes, an additional radial force is exerted against the outer and inner arcuate edges of each vane to provide an additional preloading of the vanes preventing any vibration in the vanes that might loosen the vanes or contribute to a fatigue failure.

It will be apparent from the foregoing description, that I have provided an improved vaned element of a hydrodynamic coupling device and method of fabricating the same wherein the resiliency of the curved vanes is utilized to provide forces in the vanes, upon flexing of the same, cooperating with the casing and core ring to maintain the vanes in assembly with the core ring and casing during operation of the coupling device and to effect an increase in the initial curvature of the vanes suitable for obtaining a desired toroidal flow of the fluid in the coupling device to insure a required predetermined variable torque multiplication ratio. I wish it to be understood that my invention is not to be limited to the specific constructions of a vaned element of a hydrodynamic coupling device of the torque-multiplying type and to the specific methods for making the same shown and described, except only insofar as the claims may be so limited, as it will be apparent to those skilled in the art that changes may be made without departing from the principles of the invention. Furthermore, I wish it to be understood that, although the embodiments of the invention illustrated are in connection with a turbine element, the invention is not to be limited to a turbine element to the exclusion of impeller and stator elements of a hydrodynamic coupling, unless the claims are so limited.

An advantageous feature embodied in the turbine elements described and as shown in Figs. 1 and 3 is the provision of a plurality of circumferentially spaced sets of aligned openings 50 and 51 in the casing 13 and reinforcement plate 22, respectively, and which sets of openings may be referred to as equalizer ports provided for a purpose now to be described.

Referring to Fig. 1, the impeller 10 is connected to and is driven by a plate 52 connected to power means, such as an engine (not shown) and the hub 53 of the impeller is supported on a bearing 54 mounted on a fixed reaction sleeve 64. The turbine 11 has its hub 26 drivingly connected to the shaft 55 transmitting torque to the load, such as the wheels of an automotive vehicle (not shown), and the turbine rotates within a reservoir of fluid defined by the turbine, casing 13 and the plate 52. The stator element 12 is disposed between the impeller and turbine element and has its casing, securing its vanes in position, fixed to a hub 56. Within the hub 56 is a one-way clutch of the sprag type, generally indicated at 57, and having its annular inner raceway 58 fixed to the transmission casing. The one-way clutch performs a function well known to those skilled in the art. Between the turbine hub 26 and the one-way clutch 57 is a thrust washer 59 and another thrust washer 60 is received between the bearing 54 and the one-way clutch 57. In an assembly such as described, fluid is forced by means of a pump through an axial passage 62 and a radial passage 63 in the sleeve 64 which is integral with raceway 58 and is fixed to the stationary transmission casing, the fluid then entering the converter through a radial passage 65 in thrust washer 60. This general arrangement described is conventional to hydrodynamic couplings of the torque-multiplying type and sometimes called fluid torque converters.

In dynamometer tests of fluid torque converters adapted to measure axial thrusts between the turbine, impeller and stator elements while the converter is under load, it has been determined that heavy thrust loads frequently cause the turbine to be pulled by the rotating fluid toward the impeller resulting in the thrust washers becoming rapidly worn or other failure of the thrust washers.

An analysis of the cause for the occurrence of such heavy thrust loads reveals that the fluid enters into the toroidal fluid circuit, defined by the impeller, turbine and stator elements, between the stator and impeller elements and a portion of the fluid in the circuit is continually being expelled through the clearance between the radially outer periphery of the turbine and the inside of the impeller casing. At certain stall speeds, there is a considerable centrifugal head imparted to the circulating fluid so that a substantial amount of the fluid leaks out of the circuit through the clearance between the outer periphery of the turbine casing and the inside of the impeller casing and the escaping fluid flows around on the outside of the turbine and between the turbine casing and the plate 52. The quantity of fluid thus escaping from the circuit in the converter is substantially greater than the quantity forced into the circuit by the pump, as the diameters of the passages 62, 63, and 65 from the pump to the converter are necessarily small the amount of fluid flowing into the converter is substantially less than the fluid leaking out of the circuit in the converter, whereby a very noticeable drop in the pressure of the fluid in the converter takes place. The fluid in the fluid circuit in the converter leaves the turbine and enters the stator at a very high velocity which together with the suction at the entrance of the impeller creates a low pressure area between the outlet of the turbine and the entrance of the impeller.

More particularly, an unbalance of fluid pressure exists between the fluid circulating in the toroidal fluid circuit in the converter, i. e. through the passages defined by the vanes of the impeller, turbine and stator, and the fluid circulating in the reservoir outside of the toroidal fluid circuit. This condition is due to the impeller which initiates the fluid circulation in the converter and draws fluid into its vanes at its small radius at the radially inner periphery and expels the fluid at its larger radius at its radially outer periphery into the turbine. As a result, a low fluid pressure area is caused near the small diameter of the impeller so that the higher fluid pressure on the outside of the turbine in the reservoir tends to forcibly move the turbine toward the impeller and thereby causes a heavy axial thrust by the turbine toward the impeller and thereby on the thrust washers 59 and 60.

In an endeavor to balance the fluid pressure in the toroidal vaned fluid circuit in the converter and that in the fluid reservoir between the turbine and the plate 52, a plurality of equalizer ports in the turbine in the form of axially aligned openings 50 and 51 in the casing 13 and reinforcement plate 22, respectively, substantially reduce the unbalance of fluid pressure in the converter and in the reservoir at the outer side of the turbine and thereby the resultant heavy thrust loads by effecting the flow of the fluid under high pressure in the reservoir through the equalizer ports into the fluid circulating at high velocity and low pressure in the converter to effectively substantially equalize the fluid pressure in the reservoir and in the converter. This has been proven in extensive tests conducted on dynamometers and intransmissions in automotive vehicles, wherein it has been found that failure of the thrust washers seldom occurs and, after considerable usage in the test converters, the thrust washers show only slight wear.

It will be apparent that the turbine of my invention is thus adapted to increase the efficiency and life of any hydrodynamic coupling device of the torque-multiplying type by effectively preventing the rapid wearing of thrust washers conventionally employed and required in a commercially satisfactory coupling device. It will be understood that equalizer ports may be provided as described in other turbines than that described without departing from this feature of the invention and, therefore, this inventive feature is not to be limited to the details of the turbine described, unless the claims are so limited.

I claim:

1. In a vaned element of a hydrodynamic coupling device, the combination of an annular hollow integral casing having radially inner and outer edges and a substantially semi-toroidal portion having a plurality of radially spaced sets of slots therein interrupting the continuity of the inner surface of said portion and spaced from said edges, the slots of each set being circumferentially spaced relative to each other; a plurality of substantially semi-circular vanes fitting within said casing and having arcuate margins engaging said inner surface of said casing portion and having a plurality of spaced tabs extending from the arcuate margins of said vanes into said slots of said casing, said vanes being curved in the direction of their thickness, and each vane being of resilient sheet metal and being flexed to tightly engage its tabs with the regions of said portion of said casing defining ends of said slots to hold said vanes in said casing.

2. In a vaned element of a hydrodynamic coupling as defined in claim 1, wherein one of the tabs on each of said vanes is provided with a tapered edge intersecting and disposed at an angle to a second edge of the vane tab in engagement with said casing portion, said tapered edge of said vane tab facilitating entry of the vane tab in the slot of said casing portion and engagement of said second edge of said vane tab with said casing portion.

3. In a method of making a vaned element of a hydrodynamic coupling device, the steps comprising forming a hollow annular, semi-toroidal casing; providing radially spaced sets of circumferentially spaced slots in the inner surface of said casing, the slots of each set being disposed at an angle to each other and diverging toward a radial plane intersecting the axis of said casing; forming a plurality of flexible vanes each curved in the direction of its thickness and having spaced first and second tabs on its outer margin, the linear distance between the edges of the slots of each set remote from each other being less than that between the edges of the tabs on each vane remote from each other; and connecting each vane to the casing, by inserting the tab of a vane in the slot of one set to engage said tab with the said remote edge of said slot, and rotating the vane inwardly toward and into the casing to position the second tab of the vane in the slot of the second set and to engage the second tab with the said remote edge of the slot of the second set with a snap action and flexing of the vane to induce reaction forces in the flexed vane by the engaged slot edges to seat the outer margin of the vane against the inner surface of the casing and to hold the vane in assembly with the casing.

4. In a method of assembling a vaned element of a hydrodynamic coupling defined in claim 3 wherein the second tab on each vane is provided with a tapered edge disposed at an angle to and intersecting another edge of the vane engageable with the said remote edge of the slot of the second set, rotation of each vane toward and into the casing engaging and moving the tapered edge of the vane tab along the said remote edge of the slot of the second set toward the intersecting edge of the vane tab to flex the vane and thereafter engage the latter edge with the said remote edge of the slot of the second set.

References Cited in the file of this patent

UNITED STATES PATENTS

| Number | Name | Date |
| --- | --- | --- |
| 1,637,652 | Ness | Aug. 2, 1927 |
| 1,876,518 | Mathis | Sept. 6, 1932 |
| 1,876,871 | Doman | Sept. 13, 1932 |
| 1,890,226 | Mathis | Dec. 6, 1932 |
| 2,031,521 | Baumann | Feb. 18, 1936 |
| 2,061,997 | Dunn | Nov. 24, 1936 |
| 2,074,170 | Dunn | Mar. 16, 1937 |
| 2,186,557 | Rosovsky | Jan. 9, 1940 |
| 2,205,054 | Wemp | June 18, 1940 |
| 2,336,231 | Dodge | Dec. 7, 1943 |
| 2,357,295 | Thompson | Sept. 5, 1944 |
| 2,360,383 | Zeidler | Oct. 17, 1944 |
| 2,363,983 | Miller | Nov. 28, 1944 |
| 2,387,722 | Dodge | Oct. 30, 1945 |
| 2,429,503 | Zeidler | Oct. 21, 1947 |
| 2,436,412 | Zeidler | Feb. 24, 1948 |
| 2,474,298 | Zeidler | June 28, 1949 |
| 2,542,913 | Ensign | Feb. 20, 1951 |